United States Patent
Nagano et al.

(10) Patent No.: US 9,970,439 B2
(45) Date of Patent: May 15, 2018

(54) VANE COMPRESSOR

(71) Applicant: KABUSHIKI KAISHA TOYOTA JIDOSHOKKI, Kariya-shi, Aichi-ken (JP)

(72) Inventors: Hiroki Nagano, Aichi-ken (JP); Tatsushi Mori, Aichi-ken (JP); Kunihisa Matsuda, Aichi-ken (JP); Yuya Hattori, Aichi-ken (JP)

(73) Assignee: KABUSHIKI KAISHA TOYOTA JIDOSHOKKI, Kariya-Shi (JP)

(*) Notice: Subject to any disclaimer, the term of this patent is extended or adjusted under 35 U.S.C. 154(b) by 100 days.

(21) Appl. No.: 15/195,279

(22) Filed: Jun. 28, 2016

(65) Prior Publication Data

US 2017/0002814 A1 Jan. 5, 2017

(30) Foreign Application Priority Data

Jun. 30, 2015 (JP) .................... 2015-131711

(51) Int. Cl.
*F01C 1/00* (2006.01)
*F03C 2/00* (2006.01)
(Continued)

(52) U.S. Cl.
CPC ..... *F04C 18/3441* (2013.01); *B60H 1/00428* (2013.01); *B60H 1/3227* (2013.01);
(Continued)

(58) Field of Classification Search
CPC .... F04C 2/3441; F04C 18/3441; F04C 23/02; F04C 2240/30; F04C 2240/20;
(Continued)

(56) References Cited

U.S. PATENT DOCUMENTS

| | | | | |
|---|---|---|---|---|
| 582,280 | A | * 5/1897 | Goodwin et al. ... | F01C 21/0845 418/258 |
| 4,830,593 | A | * 5/1989 | Byram ................ | F01C 21/0845 418/253 |
| 2009/0162234 | A1 | * 6/2009 | Shimaguchi ........ | F01C 21/0845 418/266 |

FOREIGN PATENT DOCUMENTS

JP 49-026104 U1 6/1974
JP 50-30650 Y1 9/1975
(Continued)

OTHER PUBLICATIONS

Communication dated Jul. 25, 2017 from the Japanese Patent Office in counterpart application No. 2015-131711.

*Primary Examiner* — Theresa Trieu
(74) *Attorney, Agent, or Firm* — Sughrue Mion, PLLC

(57) ABSTRACT

In a vane compressor, a transmission pin is accommodated in a communication hole that provides communication between a first vane slot and a second vane slot. The transmission pin includes a loose-fit portion that is loosely inserted in a recessed portion formed in a bottom surface of each of first and second vanes, a shaft portion, and a flange portion formed between the loose-fit portion and the shaft portion and in contact with the bottom surface. A coil spring is disposed in the communication hole to urge the first vane and the second vane in opposite directions away from each other via the flange portion. The coil spring is disposed around the shaft portion and supported by the flange portion so as to urge and support the transmission pin.

9 Claims, 6 Drawing Sheets

(51) Int. Cl.
  *F03C 4/00* (2006.01)
  *F04C 18/344* (2006.01)
  *B60H 1/00* (2006.01)
  *B60H 1/32* (2006.01)
  *F01C 21/08* (2006.01)
  *F04C 29/02* (2006.01)

(52) U.S. Cl.
  CPC ...... *F01C 21/0827* (2013.01); *F01C 21/0845* (2013.01); *F01C 21/0881* (2013.01); *F04C 29/02* (2013.01); *F04C 29/026* (2013.01); *F04C 2240/30* (2013.01); *F04C 2240/809* (2013.01)

(58) Field of Classification Search
  CPC .............. F04C 2240/40; F04C 2240/60; F04C 2240/603; F04C 2240/809; F04C 29/02; F04C 29/023; F04C 29/026; F01C 21/0845; F01C 21/0836; F01C 21/0827; F01C 21/0881; F01C 21/089; B60H 1/3227; B60H 1/00428
  USPC ........................ 418/253–255, 257–258, 82
  See application file for complete search history.

(56) References Cited

FOREIGN PATENT DOCUMENTS

| | | | | |
|---|---|---|---|---|
| JP | 51154405 U | * | 12/1976 | ......... F01C 21/0845 |
| JP | 60-132086 A | | 7/1985 | |
| JP | 2-103183 U | | 8/1990 | |

\* cited by examiner

UPPER
FRONT ←↕→ REAR
LOWER

VANE COMPRESSOR

BACKGROUND OF THE INVENTION

The present invention relates to a vane compressor.

Japanese Unexamined Utility Model Application Publication No. 49-26104 discloses a vane compressor. The vane compressor includes a housing having therein a cylindrical rotor chamber, a rotor, and four vanes. The rotor is provided in the rotor chamber so as to be rotatable about the axis of rotation. The rotor has two first vane slots formed extending radially toward the axis of rotation and two second vane slots that are also formed extending radially toward the axis of rotation at positions opposite to the respective first vane slots with respect to the axis of rotation. The four vanes include two first vanes that are disposed in the first vane slots so as to be slidable in and out of the first vane slots and two second vanes that are disposed in the second vane slots so as to be slidable in and out of the second vanes.

The rotor has two communication holes that extend in radial directions. One of the communication holes is formed in communication at the opposite ends thereof with one of the first vane slots and one of the second vane slots that are opposite to each other with respect to the extending direction of the communication hole, and the other of the communication holes is in communication at the opposite ends thereof with the other first vane slot and the other second vane slot. A transmission pin is inserted in each of the communication holes.

A first coil spring is accommodated in each of the first vane slots, and a second coil spring is accommodated in each of the second vane slots. Specifically, each first coil spring is disposed between the vane and one end of the transmission pin so that the first vane and the transmission pin are urged by the first coil spring in opposite directions. Each second coil spring is disposed between the bottom surface of the second vane and one end of the transmission pin so that the second vane and the transmission pin are urged by the second coil spring in opposite directions away each other.

According to the vane compressor of the Publication, the movement of the first vane in the first vane slot is transmitted to its corresponding opposite second vane through the transmission pin and the first and second coils springs. Similarly, the movement of the second vane in the second vane slot is transmitted to its corresponding opposite first vane through the transmission pin and the first and second coil springs. The coil springs absorb or allow the variation in the distance between the first and second vanes sliding in and out of the first vane slot and the second vane slot, respectively, by extending and compressing.

According to the vane compressor of the Publication, with the compression and extension of the first and second coil spring, the first vanes and the second vanes slide in and out of the first vane slots and the second vane slots, respectively. Facing surfaces of two side plates disposed on opposite sides of the rotor chamber, the inner peripheral surface of the rotor chamber, the outer peripheral surface of the rotor, and two adjacent vanes form a compression chamber. With the rotation of the rotor, fluid is taken into the compression chamber and compressed.

However, according to the vane compressor of the Publication, in which the first vanes and the transmission pins are disposed separate from each other, there is a fear that the bottom surfaces of the first vanes may be brought into contact with the end of the transmission pins when the first vanes slide in the first vane slots, which causes development of intermittent noise with the rotation of the rotor. This also holds true for the second vanes and the transmission pins.

Further, according to the vane compressor of the Publication, the first coil spring urges the first vane by direct contact with the bottom surface of the first vane, and the second coil spring urges the second vane by direct contact with the bottom surface of the second vane. The first and second coil springs may not urge the first and second vanes stable, and the fluid may leak from the compression chamber. Accordingly, it is difficult for the vane compressor to improve its compression efficiency.

The present invention which has been made in view of the circumstances above is directed to providing a vane compressor that is silent in operation and offers an improved compression efficiency.

SUMMARY OF THE INVENTION

In accordance with an aspect of the present invention, there is provided a vane compressor that includes a housing having therein a rotor chamber, a rotor that is disposed in the rotor chamber so as to be rotatable about an axis of rotation and has therein a pair of vane slots, and a plurality of vanes provided in the respective vane slots so as to be slidable in and out of the vane slot. A compression chamber is formed by one surface of the rotor chamber, the other surface of the rotor chamber, an inner peripheral surface of the rotor chamber, an outer peripheral surface of the rotor, and any two adjacent vanes. In the vane compressor, the vane slots include a first vane slot and a second vane slot that extends in a direction in which the first vane slot extends. The vanes include a first vane slidably received in the first vane slot and a second vane slidably received in the second vane slot. The rotor has therein a communication hole that provides communication between the first vane slot and the second vane slot. The first vane and the second vane have respective bottom surfaces near the axis of rotation of the rotor. At least one of the first vane and the second vane has a recessed portion in the corresponding bottom surface. The vane compressor further includes a transmission pin that is accommodated in the communication hole. The transmission pin includes a loose-fit portion that is loosely inserted in the recessed portion, a shaft portion that extends in a direction opposite to a direction in which the loose-fit portion is inserted, and a flange portion that is formed between the loose-fit portion and the shaft portion and in contact with the bottom surface in which the recessed portion is formed. The vane compressor further includes a coil spring that is disposed in the communication hole to urge the first vane and the second vane in opposite directions away from each other via the flange portion. The coil spring is disposed around the shaft portion and supported by the flange portion so as to urge and support the transmission pin.

Other aspects and advantages of the invention will become apparent from the following description, taken in conjunction with the accompanying drawings, illustrating by way of example the principles of the invention.

BRIEF DESCRIPTION OF THE DRAWINGS

FIG. 2 is a fragmentary enlarged cross-sectional view of the vane compressor of FIG. 1, showing a rotor, a first vane, a second vane, a first transmission pin, a second transmission pin, a coil spring, and the like;

DETAILED DESCRIPTION OF THE EMBODIMENTS

The following will describe first and second embodiments of the present invention with reference to the accompanying drawings.

First Embodiment

Figure 1:
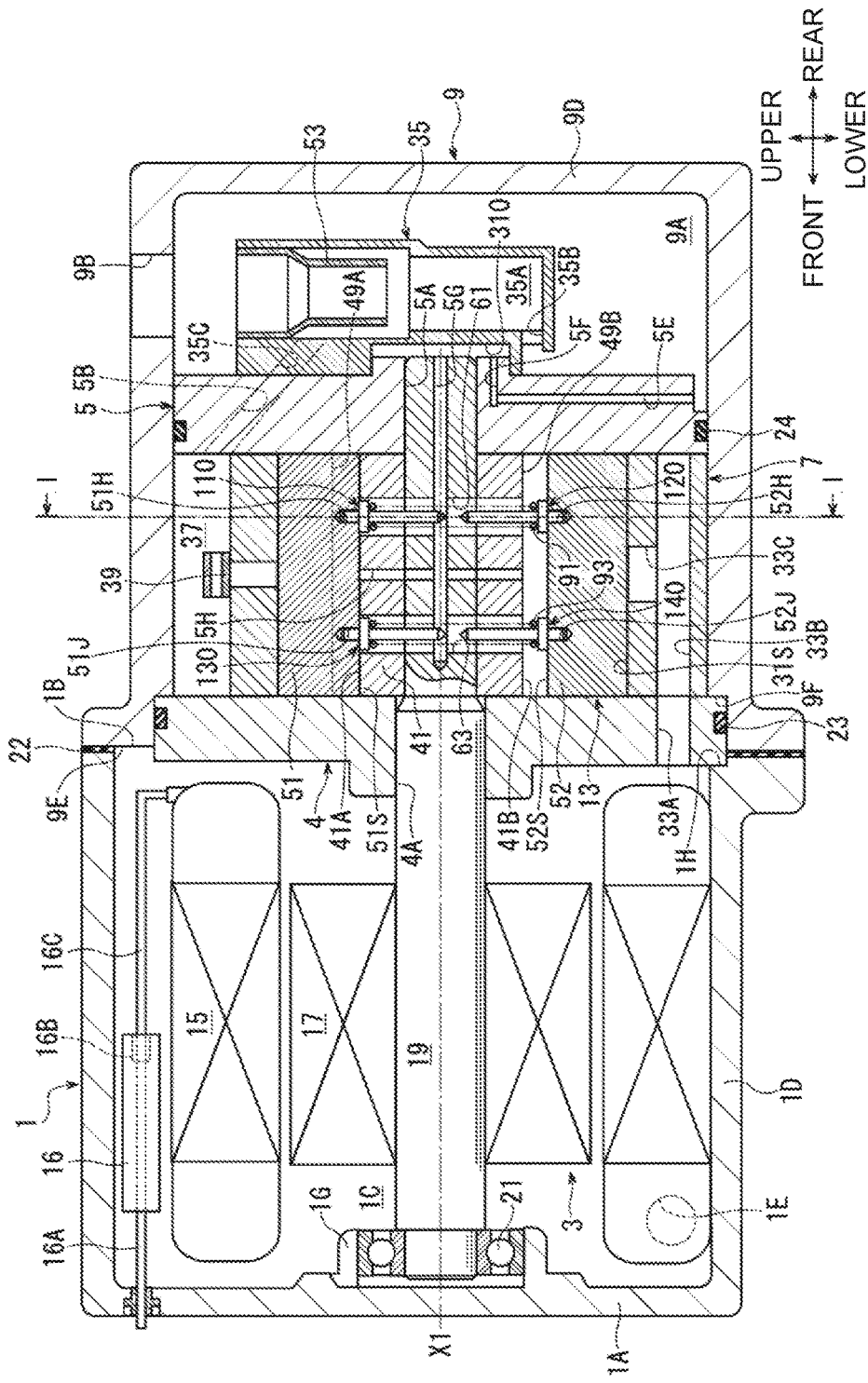
FIG. 1 is a longitudinal cross-sectional view of a vane compressor according to a first embodiment of the present invention.

FIG. 1 shows an electric vane compressor (hereinafter, referred to as the compressor) according to a first embodiment of the present invention. The compressor includes a motor housing 1, a motor mechanism 3, a first side plate 4, a second side plate 5, a cylinder block 7, a cover 9, and a compression mechanism 13. The motor housing 1, the first and second side plates 4, 5, the cylinder block 7, and the cover 9 cooperate to form one example of the housing of the present invention.

In the following description, the left side of FIG. 1 where the motor housing 1 is illustrated will be referred to as the front side of the compressor, and the right side of FIG. 1 where the cover 9 is illustrated as the rear side of the compressor, and the upper side of FIG. 1 as the upper side of the compressor, and the lower side of FIG. 1 as the lower side of the compressor, respectively. Such positions and directions in FIG. 1 are also applicable to the remaining FIGS. 2 to 6. It is to be noted, however, that the terms such as right, left, upper and lower will be used in the description of the present embodiments as one example and that the posture of the compressor as actually mounted on a vehicle may be changed.

Referring to FIG. 1, the motor housing 1 is of a bottomed cylindrical shape having at the front end thereof a bottom wall 1A and at the rear end thereof an open end 1B, and a cylindrical portion 1D extending in the axial direction between the bottom wall 1A and the open end 1B. The cylindrical portion 1D is connected at a front peripheral edge thereof with an outer circumferential edge of the bottom wall 1A. The motor housing 1 has therein a motor chamber 1C that also functions as a suction chamber. The cylindrical portion 1D has a substantially cylindrical shape about the axis of rotation X1 of a rotary shaft 19. An intake port 1E is formed through the cylindrical portion 1D of the motor housing 1, providing communication between the motor chamber 1C and the outside of the compressor. An evaporator (not shown) for a vehicle air conditioner is connected to the intake port 1E through a pipe (not shown). The bottom wall 1A of the motor housing 1 has a shaft support portion 1G extending rearward in the axial direction and receiving therein a bearing 21.

The motor mechanism 3 includes a stator 15 and a rotor 17. The stator 15 is fixed to the inner peripheral surface of the cylindrical portion 1D of the motor housing 1. A lead wire 16C and a cluster block 16 are accommodated in the cylindrical portion 1D.

The cluster block 16 has connection terminals 16A and 16B. The connection terminal 16A extends out of the motor housing 1 through the bottom wall 1A. The connection terminal 16B is connected to the stator 15 through lead wire 16C. Power is supplied appropriately from a power supply unit (not shown) to the stator 15 through the cluster block 16 and the lead wire 16C.

The rotor 17 is disposed radially inward of the stator 15. The aforementioned rotary shaft 19 has the axis of rotation X1 and extends in the longitudinal direction in the motor housing 1. The rotor 17 is fixedly mounted on the rotary shaft 19 for rotation therewith. The front end portion of the rotary shaft 19 is supported by the bearing 21.

The cover 9 has a cylindrical shape and is fixed to the rear end of the motor housing 1 by a plurality of bolts (not shown). The cover 9 has an open end 9E at the front end thereof and a bottom wall 9D closing the rear end thereof. The open end 9E of the cover 9 is abutted to the open end 1B of the motor housing 1 to thereby close the motor housing 1 and the cover 9. A gasket 22 is provided between the open end 1B of the motor housing 1 and the open end 9E of the cover 9.

The cover 9 has at the open end 9E thereof a first stepped portion 9F that is formed by recessing part of the inner peripheral surface of the cover 9 annularly about the axis of rotation X1 of the rotary shaft 19. The motor housing 1 has at the open end 1B thereof a second stepped portion 1H that is formed by recessing part of the inner peripheral surface of the motor housing 1 annularly about the axis of rotation X1 of the rotary shaft 19. The first side plate 4 is fitted in the annular recess thus formed by the first stepped portion 9F and the second stepped portion 1H. The first side plate 4 is a planar member that extends radially in a plane perpendicular to the axis of rotation X1. The outer circumferential portion of the first side plate 4 is held by and between the second stepped portion 1H of the motor housing 1 and the first stepped portion 9F of the cover 9.

An O-ring 23 is provided between the outer peripheral surface of the first side plate 4 and the inner peripheral surface of the first stepped portion 9F to seal between the outer peripheral surface of the side plate 4 and the inner peripheral surface of the first stepped portion 9F. The first side plate 4 has therethrough a shaft hole 4A through which the rotary shaft 19 is passed. The shaft hole 4A is coated (not shown) so that the rotary shaft 19 slides smoothly in the shaft hole 4A.

The cylinder block 7, the second side plate 5, and a block 35, which will be described in later part thereof, are accommodated in the cover 9. The cylinder block 7 and the second side plate 5 are assembled to the rear of the first side plate 4 by bolts 25A to 25D shown in FIGS. 3 and 4. As shown in FIG. 1, the cylinder block 7 is held at the front and rear ends thereof by the first side plate 4 and the second side plate 5, respectively.

The second side plate 5 is fitted to the inner peripheral surface of the cover 9. The second side plate 5 is a planar member that extends radially in a plane perpendicular to the axis of rotation Xl. An O-ring 24 is provided between the outer peripheral surface of the second side plate 5 and the inner peripheral surface of the cover 9.

The second side plate 5 has therethrough a shaft hole 5A through which the rotary shaft 19 is passed. The shaft hole 5A is coated (not shown) so that the rotary shaft 19 slides smoothly in the shaft hole 5A. The rear end portion of the rotary shaft 19 is supported by the shaft hole 5A. Thus, the rotary shaft 19 is supported at one end thereof by the bottom wall 1A of the motor housing 1 and at the other end thereof by the shaft hole 5A of the second side plate 5 so as to be rotatable about the axis of rotation Xi.

A discharge chamber 9A is formed between the bottom wall 9D of the cover 9 and the rear surface of the second side plate 5. A discharge port 9B is formed through the cover 9 to provide communication between the discharge chamber 9A and the outside of the compressor. A condenser (not shown) for the vehicle air conditioner is connected to the discharge port 9B through a pipe (not shown).

The aforementioned block 35 is fixed to the rear surface of the second side plate 5. The block 35 has therein a cylindrical oil separation chamber 35A extending substantially vertically with respect to the rotary shaft 19. The cylindrical member 53 is fixedly disposed within the oil separation chamber 35A. An upper end of the cylindrical member 53 is opened to the discharge chamber 9A. The oil separation chamber 35A is opened to the discharge chamber 9A through an oil drain port 35B formed at the lower end of the oil separation chamber 35A. Passages 5B and 35C are formed through the second side plate 5 and the block 35, respectively, in communication with each other. The passages 5B and 35C provide communication between the oil separation chamber 35A and a discharge space 37, which will be described later. The oil separation chamber 35A and the cylindrical member 53 form an oil separator.

Part of the rear surface of the second side plate 5 surrounding the shaft hole 5A, the rear end surface of the rotary shaft 19, and the front surface of the block 35 form an oil supply chamber 310.

The second side plate 5 has therein a first passage 5E extending radially toward the axis of rotation X1 and opened at one end thereof to a lower part of the discharge chamber 9A. The second side plate 5 further has therein a second passage 5F extending axially in communication at one end thereof with the other end of the first passage 5E and at the other end thereof with the oil supply chamber 310.

Figure 2:
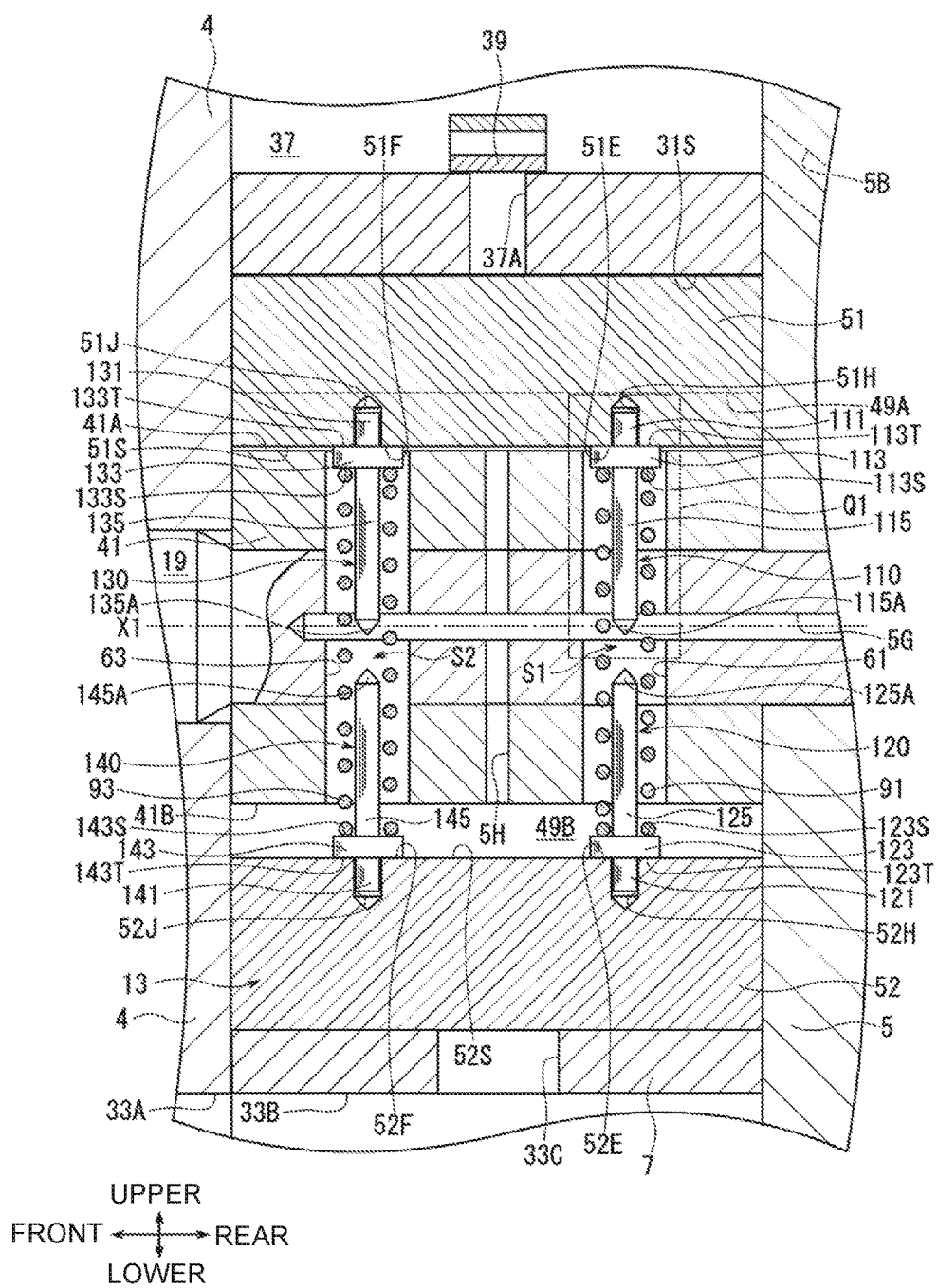
Figure 3:
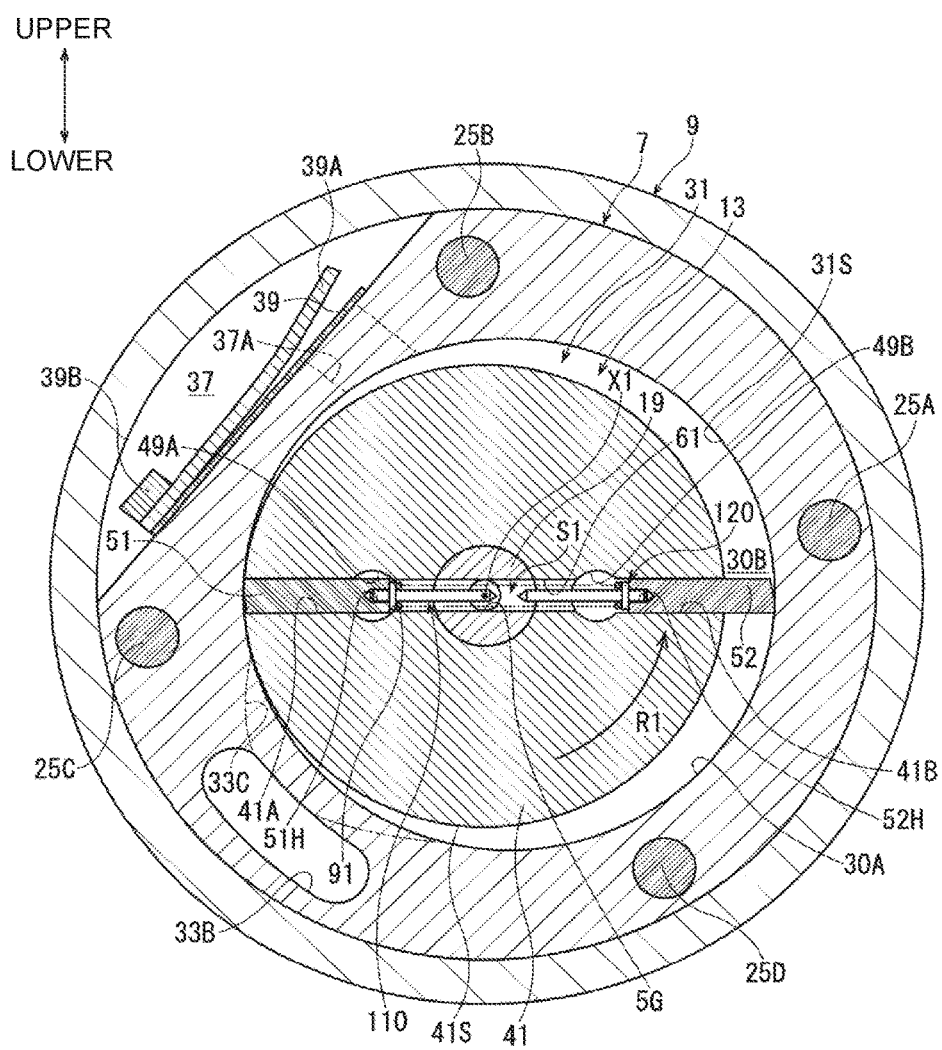
FIG. 3 is a transverse cross-sectional view taken along line I-I in FIG. 1.
Figure 4:
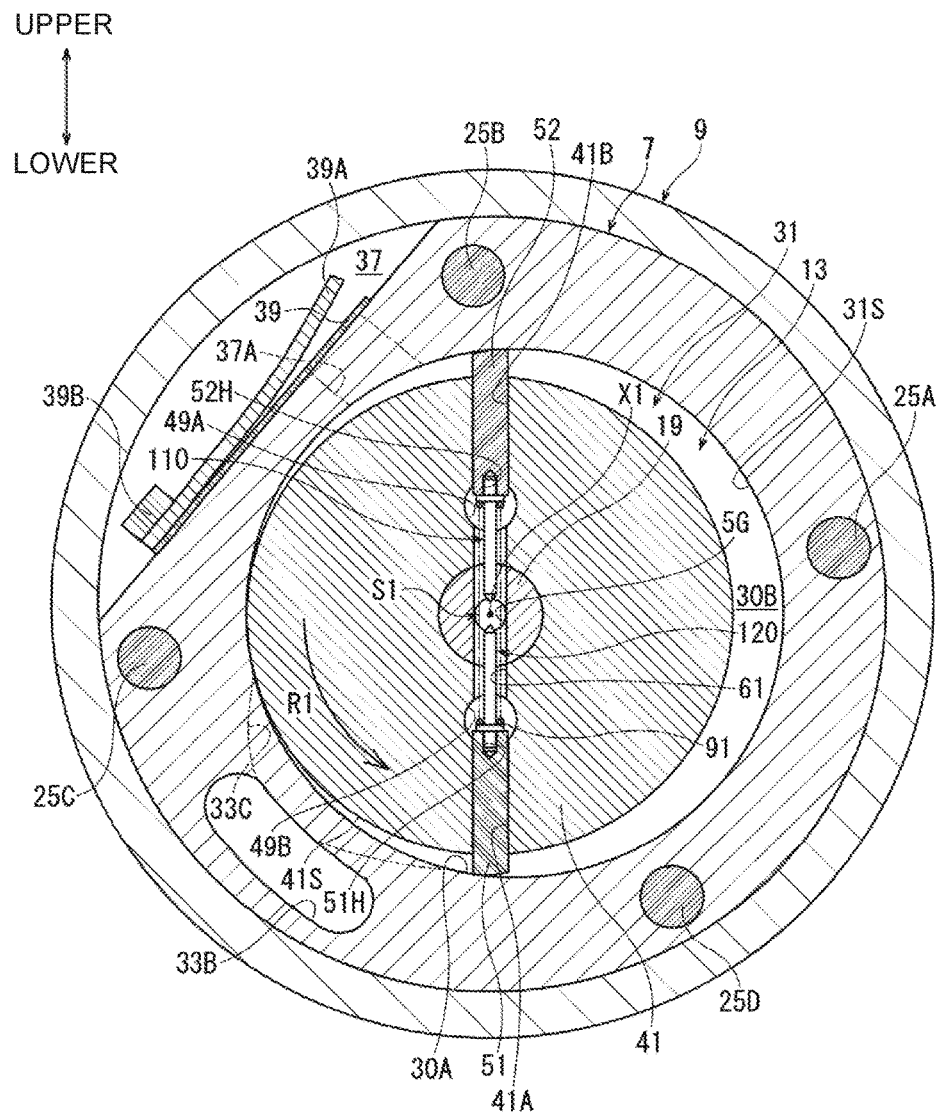
FIG. 4 is another transverse cross-sectional view taken along line I-I in FIG. 1.

As shown in FIGS. 1 and 2, the cylinder block 7 has a cylindrical shape and is disposed extending in the direction in which the axis of rotation X1 of the rotary shaft 19 extends. As shown in FIGS. 3 and 4, the cylinder block 7, the first side plate 4 (FIG. 2), and the second side plate 5 (FIG. 2) form a rotor chamber 31 in the cylinder block 7. According to the first embodiment, an inner peripheral surface 31S of the rotor chamber 31 forms a true circle shape in cross section that is eccentric to the axis of rotation X1. A front surface of the rotor chamber 31 corresponds to the one surface of the rotor chamber of the present invention and a rear surface of the rotor chamber 31 corresponds to the other surface of the rotor chamber of the present invention. The rear surface of the first side plate 4, the front surface of the second side plate 5, and the inner peripheral surface 31S of the rotor chamber 31, and first and second vanes 51 and 52 are coated (not shown) for smooth sliding against a rotor 41. Details of the first and second vanes 51 and 52 and the rotor 41 will be described later.

As shown in FIG. 1, the first side plate 4 has therethrough a suction passage 33A extending in the axial direction of the cylindrical motor housing 1 and opened at one end thereof to the motor chamber 1C. The cylinder block 7 has therethrough a suction passage 33B that is formed in communication with the suction passage 33A. As shown in FIGS. 3 and 4, the suction passage 33B is communicable with the rotor chamber 31 through a suction port 33C formed in the cylinder block 7.

The aforementioned discharge space 37 is formed between part of the outer periphery of the cylinder block 7 and the inner periphery of the cover 9. The discharge space 37 is communicable with the rotor chamber 31 through a discharge port 37A formed through the peripheral wall of the cylinder block 7. In the discharge space 37, a discharge reed valve 39 for opening and closing the discharge port 37A and a retainer 39A that regulates the opening of the discharge reed valve 39 are fixed to the cylinder block 7 by a bolt 39B.

The rotor chamber 31 the rotor 41, and the first and second vanes 51 and 52 form the compression mechanism 13.

As shown in FIG. 1, the rotary shaft 19 is fixed in the rotor 41 by being press-fitted so as to be rotatable with the rotor 41 in the rotor chamber 31. As shown in FIGS. 3 and 4, the outer peripheral surface 41S of the rotor 41 forms substantially a true circle in cross section that has the axis of rotation X1 at the center thereof. According to the first embodiment, the rotor 41 rotates counterclockwise as indicated by arrow R1 as viewed in FIGS. 3 and 4.

The rotor 41 has therein a first vane slot 41A and a second vane slot 41B that extend radially from the axis of rotation X1 of the rotor 41. Specifically, the second vane slot 41B is formed extending in the direction in which the first vane slot 41A extends. The first vane slot 41A and the second vane slot 41B are symmetrical to each other with respect to the axis of rotation X1.

The first vane 51 is inserted in the first vane slot 41A and the second vane 52 is inserted in the second vane slot 41B. With the rotation of the rotor 41, the first vane 51 slides in and out of the first vane slot 41A with a tip of the first vane 51 sliding contact with the inner peripheral surface 31S of the rotor chamber 31. With the rotation of the rotor 41, the second vane 52 slides in and out of the second vane slot 41B with a tip of the second vane 52 sliding on the inner peripheral surface 31S of the rotor chamber 31. The first vane 51 and the second vane 52 are flat plates of the same shape.

As shown in FIG. 2, the first vane 51 has a bottom surface 51 S near the center of the rotor 41, and recessed portions 51H and 51J are formed in the bottom surface 51S. The recessed portions 51H and 51J have substantially the same shape and extend radially outward from the bottom surface 51S of the first vane 51. The recessed portion 51J is located frontward of the recessed portion 51H in the axial direction of the rotary shaft 19. The recessed portions 51H and 51J correspond to the first recessed portion of the present invention.

The second vane 52 has a bottom surface 52S near the center of the rotor 41, and recesses 52H and 52J are formed in the bottom surface 52S. The recessed portions 52H and 52J have substantially the same shape and extend radially outward from the bottom surface 52S. The recessed portion 52J is located frontward of the recessed portion 52H in the axial direction of the rotary shaft 19. The recessed portions 52H and 52J correspond to the second recessed portion of the present invention.

As shown in FIGS. 3 and 4, the front surface of the rotor chamber 31, the inner peripheral surface 31S of the rotor chamber 31, the rear surface of the rotor chamber 31, the outer peripheral surface 41S of the rotor 41, and the first and second vanes 51 and 52 form a compression chamber 30A and a compression chamber 30B.

Figure 5:
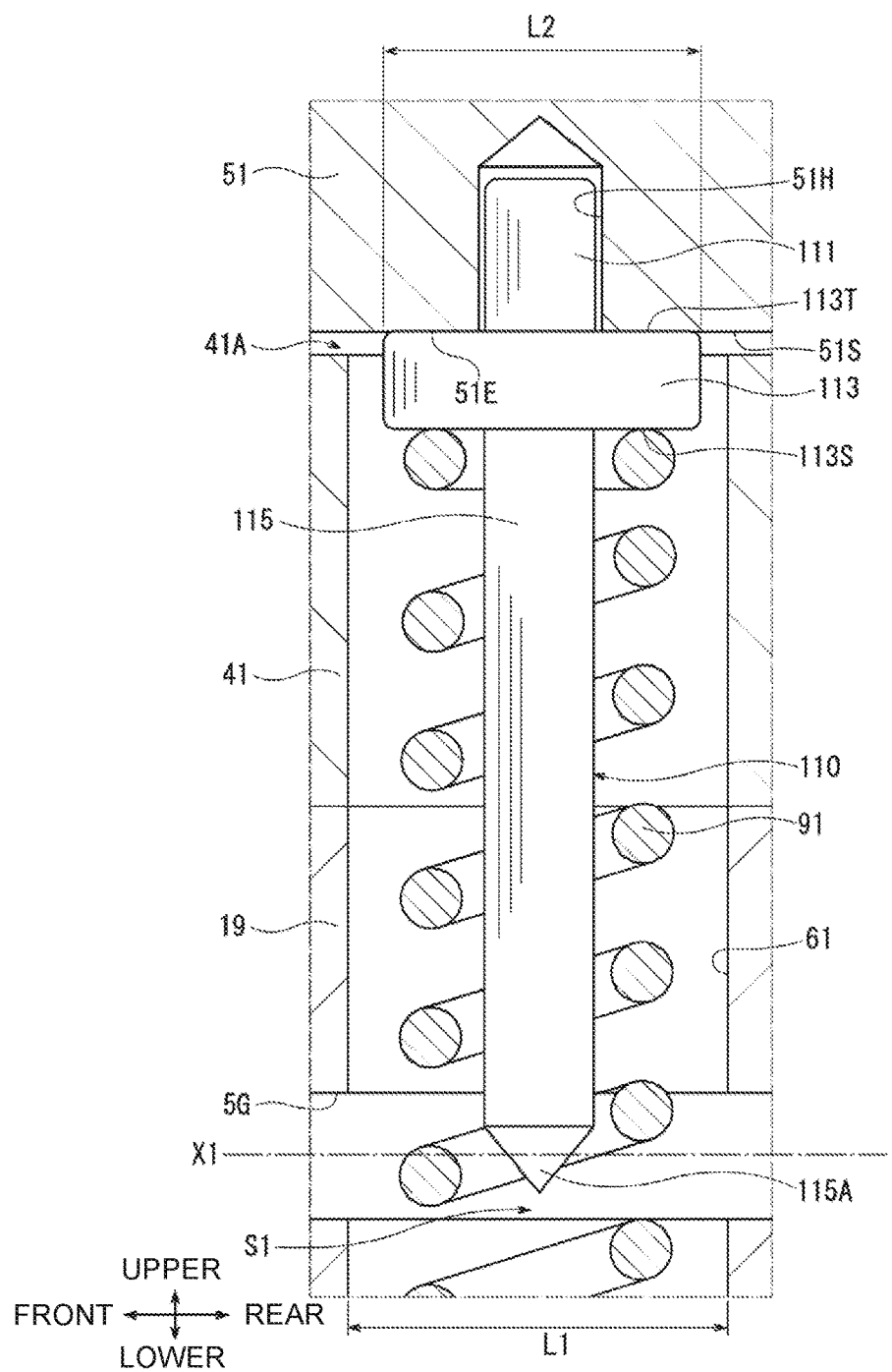
FIG. 5 is a fragmentary enlarged view of the region Q1 in the cross-sectional view of FIG. 2.

Referring to FIG. 2, a first communication hole 61 and a second communication hole 63 are formed through the rotor 41 and the rotary shaft 19. The first and second communication holes 61 and 63 correspond to the communication hole of the present invention. As shown in FIG. 5, the first and second communication holes 61 and 63 have a diameter L1. The second communication hole 63 also has the diameter L1.

As shown in FIG. 2, each of the first and second communication holes 61 and 63 extends in the radial direction passing through the axis of rotation X1 of the rotary shaft 19 and is opened at one end thereof at the bottom surface of the first vane slot 41A and at the other end thereof at the bottom surface of the second vane slot 41B. In other words, the first vane slot 41A and the second vane slot 41B are in communication with each other through the first and second communication holes 61 and 63. The second communication hole 63 is located frontward of the first communication hole 61. The first communication hole 61 is in communication at one end thereof with the recessed portion 51H of the first vane 51 and at the other end thereof with the recessed portion 52H of the second vane 52. Further, the second communication hole 63 is in communication at one end thereof with the recessed portion 51J of the first vane 51 and at the other end thereof with the recessed portion 52J of the second vane 52.

Transmission pins 110 and 130 are mounted in the first vane 51 and the transmission pins 120 and 140 are fitted in the second vane 52. The first and second transmission pins 110 to 140 have substantially the same shape. Details of the first and second transmission pins 110 to 140 will be described later.

The first and second transmission pins 110 and 120 are disposed in the first communication hole 61 in alignment with each other on the same axis in the first communication hole 61. The first transmission pin 110 and the second transmission pin 120 are disposed in the first communication hole 61 with the ends thereof on the side adjacent to the axis of rotation X1 facing each other with a clearance S1 therebetween. A first coil spring 91 is disposed in the first communication hole 61.

The first transmission pin 130 and the second transmission pin 140 are disposed in the second communication hole 63 in alignment with each other on the same axis in the second communication hole 63. The first transmission pin 130 and the second transmission pin 140 are disposed in the second communication hole 63 with the ends of the first and second transmission pins 130 and 140 on the side adjacent to the axis of rotation X1 facing each other with a clearance S2 therebetween. A second coil spring 93 is disposed in the second communication hole 63. The first and second coil springs 91 and 93 correspond to the coil spring of the present invention.

The clearance S1 is formed to ensure a distance that prevents contact between the slidable first and second transmission pins 110 and 120. The clearance S2 is formed to such an extent that contact between the first and second transmission pins 130 and 140 is prevented. Specifically, the clearances S1 and S2 are designed in consideration with the distance between the bottom surface 51S of the first vane 51 and the bottom surface 52S of the second vane 52 that is variable with the phases of the first and second vanes 51 and 52, and the tolerances of the dimension of the first and second transmission pins 110 to 140, the first and second vanes 51 and 52, the first and second vane slots 41A and 41B, and the like.

As shown in FIG. 5, the first transmission pin 110 has a substantially columnar shape extending in a radial direction of the rotor 41 and includes a first loose-fit portion 111, a first flange portion 113, and a first shaft portion 115. The first flange portion 113 is located between the first loose-fit portion 111 and the first shaft portion 115.

The first loose-fit portion 111 extends radially outward direction of the rotor 41 from the first flange portion 113 away from the axis of rotation X1. The first loose-fit portion 111 has a diameter that is smaller than that of the recessed portion 51H so that the loose-fit portion 111 is received loosely in the recessed portion 51H. The axial length of the first loose-fit portion 111 is smaller than the depth of the recessed portion 51H.

The first flange portion 113 is formed around the entire circumference of the first transmission pin 110 and extends in the radial direction of the transmission pin 110 and disposed between the first loose-fit portion 111 and the first shaft portion 115. The first flange portion 113 has a first end surface 113T on the side adjacent to the first loose-fit portion 111 and a second end surface 113S on the opposite side adjacent to the first shaft portion 115. The first and second end surfaces 113T and 113S are formed flat. The first flange portion 113 has a diameter L2 that is greater than the diameters of the first loose-fit portion 111 and the first shaft portion 115. The diameter L2 of the first flange portion 113 is smaller than the diameter L1 of the first communication hole 61 and hence the first flange portion 113 is smaller than the first communication hole 61 in diameter.

The first shaft portion 115 extends in the radial direction of the rotor 41 from the first flange portion 113 toward the axis of rotation X1, or in the direction opposite to the direction in which the first loose-fit portion 111 is inserted. The first shaft portion 115 has substantially the same diameter as that of the first loose-fit portion 111. The first shaft portion 115 has at the end thereof adjacent to the axis of rotation X1 a first tapered portion 115A that is tapered toward the second transmission pin 120. The first tapered portion 115A corresponds to the first tapered portion of the present invention. It is to be noted that the first loose-fit portion 111 and the first shaft portion 115 may have different diameters.

The second transmission pin 120 has a substantially columnar shape extending in a radial direction of the rotor 41 and includes a second loose-fit portion 121, a second flange portion 123, and a second shaft portion 125, as in the case of the first transmission pin 110. The second flange portion 123 is located between the second loose-fit portion 121 and the first shaft portion 125.

The second loose-fit portion 121 extends in the radially outward direction of the rotor 41 from the second flange portion 123 away from the axis of rotation X1. The second loose-fit portion 121 has a diameter that is smaller than that of the recessed portion 52H so that the loose-fit portion 121 is received loosely in the recessed portion 52H. The axial length of the second loose-fit portion 121 is smaller than the depth of the recessed portion 52H.

The second flange portion 123 is formed around the entire circumference of the second transmission pin 120 and extends in the radial direction of the transmission pin 120 and disposed between the second loose-fit portion 121 and the second shaft portion 125. The second flange portion 123 has a first end surface 123T on the side adjacent to the second loose-fit portion 123 and a second end surface 123S on the opposite side adjacent to the second shaft portion 125. The first and second end surfaces 123T and 123S are formed flat. The second flange portion 123 has the same diameter as that of the first flange portion 113. Accordingly, the second flange portion 123 has a diameter that is smaller than the diameter of the first communication hole 61.

The second shaft portion 125 extends in the radial direction of the rotor 41 from the second flange portion 123 toward the axis of rotation X1, or in the direction opposite to the direction in which the second loose-fit portion 121 is inserted. The second shaft portion 125 has substantially the same diameter as the second loose-fit portion 121. The second shaft portion 125 has at the end thereof adjacent to the axis of rotation X1 a second tapered portion 125A that is tapered toward the first transmission pin 110. The second tapered portion 125A corresponds to the second tapered portion of the present invention. It is to be noted that the second loose-fit portion 121 and the second shaft portion 125 may have different diameters.

The first transmission pin 130 includes a first loose-fit portion 131, a first flange portion 133, and a first shaft portion 135. The first flange portion 133 has a first end surface 133T and a second end surface 133S. The first shaft portion 135 has at the end thereof a first tapered portion 135A. The first tapered portion 135A corresponds to the first tapered portion of the present invention. The configuration of the first transmission pin 130 including the first loose-fit portion 131, the first flange portion 133, and the first shaft portion 135 is substantially the same as that of the first transmission pin 110. Therefore, further detailed description of the first transmission pin 130 will be omitted.

The second transmission pin 140 includes a second loose-fit portion 141, a second flange portion 143, and a second shaft portion 145. The second flange portion 143 has a first end surface 143T and a second end surface 143S. The second shaft portion 145 has at the end thereof adjacent to the axis of rotation X1 a second tapered portion 145A that is tapered toward the first transmission pin 130. The second tapered portion 145A corresponds to the second tapered portion of the present invention. The configuration of the second transmission pin 140 including the second loose-fit portion 141, the second flange portion 143, and the second shaft portion 145 is substantially the same as the second transmission pin 120. Therefore, further detailed description of the second transmission pin 140 will be omitted.

Referring to FIG. 5, the first transmission pin 110 is mounted in the first vane 51 while being positioned with respect to the first vane 51 with the first loose-fit portion 111 of the first transmission pin 110 loosely inserted in the recessed portion 51H of the first vane 51. The first loose-fit portion 111 of the first transmission pin 110 is loosely inserted in the recessed portion 51H with such a clearance formed between the outer peripheral surface of the loose-fit portion 111 and the inner peripheral surface of the recessed portion 51H that the first flange portion 113 is brought into contact with the inner surface of the recessed portion 51H instead of the inner peripheral surface of the first communication hole 61. Specifically, the clearance may be formed appropriately with a distance between the axial centers of the recessed portion 51H and the first flange portion 113, the diameters of the first flange portion 113, the first communication hole 61, the recessed portion 51H, and the first loose-fit portion 111 and the tolerances thereof taken into consideration. The clearance between the inner peripheral surface of the recessed portion 51H and the first loose-fit portion 131 and other clearances are also designed in the same manner as in the above. As described earlier, the axial length of the first loose-fit portion 111 is smaller than the depth of the recessed portion 51H, so that the first end surface 113T of the first flange portion 113 of the first transmission pin 111 is in surface contact with an edge portion 51E of the first vane 51 around the recessed portion 51H. As shown in FIG. 2, the first loose-fit portion 131 of the first transmission pin 130 is loosely inserted in the recessed portion 51J of the first vane 51, thus the first transmission pin 130 being mounted while being positioned with respect to the first vane 51. The axial length of the first loose-fit portion 131 is smaller than the depth of the recessed portion 51J, so that the first end surface 133T of the first flange portion 133 is in surface contact with the edge portion 51F of the first vane 51 around the recessed portion 51J.

The second loose-fit portion 121 of the second transmission pin 120 is loosely inserted in the recessed portion 52H of the second vane 52 and thereby the second transmission pin 120 is mounted while being positioned with respect to the second vane 51. The axial length of the second loose-fit portion is smaller than the depth of the recessed portion 52H, so that the first end surface 123T of the second flange portion 123 is in surface contact with the edge portion 52E of the second vane 52 around the recessed portion 52H. The second loose-fit portion 141 of the second transmission pin 140 is loosely inserted in the recessed portion 52J of the second vane 52 and thereby the second transmission pin 140 is mounted while being positioned with respect to the second vane 52. The axial length of the second loose-fit portion 141 is smaller than the depth of the recessed portion 52J, so that the first end surface 143T of the second flange portion 143 is in surface contact with the edge portion 52F of the recessed portion 52J.

In the first communication hole 61, the first coil spring 91 is disposed between the first transmission pin 110 and the second transmission pin 120. The first shaft portion 115 of the first transmission pin 110 is inserted in the first coil spring 91 on one side thereof and the second shaft portion 125 is inserted in the first coil spring 91 on the other side thereof. The first coil spring 91 that is thus supported by the first and second shaft portions 115 and 125 is allowed to enter the first vane slot 41A and the second vane slot 41B with the rotation of the rotor 41.

As shown in FIG. 2, one end of the first coil spring 91 is in contact with the second end surface 113S of the first flange portion 113 and the other end of the first coil spring 91 is in contact with the second end surface 123S of the second flange portion 123. The first coil spring 91 whose opposite ends are supported or received by the first flange portion 113 and the second flange portion 123, respectively, is maintained in a compressed state between the first transmission pin 110 and the second transmission pin 120 and urges the first vane 51 and the second vane 52 in opposite directions away from each other via the first transmission pin 110 and the second transmission pin 120, respectively.

In the second communication hole 63, the second coil spring 93 is disposed between the first transmission pin 130 and the second transmission pin 140. The first shaft portion 135 of the first transmission pin 130 is inserted in the second coil spring 93 on one side thereof and the second shaft portion 145 of the second transmission pin 140 is inserted in the second coil spring 93 on the other side thereof. The second coil spring 93 that is supported by the first and second shaft portions 135 and 145 is allowed to enter the first vane slot 41A and the second vane slot 41B with the rotation of the rotor 41.

As shown in FIG. 2, one end of the second coil spring 93 is in contact with the second end surface 133S of the first flange portion 133 and the other end of the second coil spring 93 is in contact with the second end surface 143S of the second flange portion 143. The second coil spring 93 that is supported at opposite ends thereof by the first flange portion 133 and the second flange portion 143 is maintained in a compressed state between the first transmission pin 130 and the second transmission pin 140 and urges the first vane 51 and the second vane 52 in opposite directions away from each other via the first transmission pin 130 and the second transmission pin 140, respectively. Therefore, the first vane 51 and the second vane 52 are supported by the urging forces of the first coil spring 91 and the second coil spring 93 acting thereon in radially opposite directions of the rotor 41.

It is to be noted that the first end surface 113T of the first flange portion 113 of the first transmission pin 110 is kept in contact with the edge portion 51E by being urged and supported by the first coil spring 91. The first end surface 123T of the second flange portion 123 of the second transmission pin 120 is kept in contact with the edge portion 52E by being urged and supported by the first coil spring 91. Similarly, the first end surface 133T of the first flange portion 133 of the first transmission pin 130 is kept in contact with the edge portion 51F by being urged and supported by the second coil spring 93. The first end surface 143T of the second flange portion 143 of the second transmission pin 140 is kept in contact with the edge portion 51F by being urged and supported by the second coil spring 93. In other words, the first transmission pins 110 and 130 are kept in contact with the bottom surface 51S of the first vane 51. The second transmission pins 120 and 140 are kept in contact with the bottom surface 52S of the second vane 52.

As shown in FIGS. 3 and 4, a first backpressure chamber 49A is formed between the bottom surface 51S of the first vane 51 and the bottom surface of the first vane slot 41A. Similarly, a second backpressure chamber 49B is formed between the bottom surface 52S of the second vane 52 and the bottom surface of the second vane slot 41B.

As shown in FIG. 1, a first communication passage 5G is formed extending axially in the rotary shaft 19. A second communication passage 5H is formed extending radially in the rotary shaft 19 and the rotor 41. The first communication passage 5G extends frontward from the rear end surface of the rotary shaft 19 along the axis of rotation X1. The first communication passage 5G is in communication with the first communication hole 61 and the second communication hole 63. The second communication hole 5H extending in the radial direction of the rotor 41 is in communication with the first backpressure chamber 49A and the second backpressure chamber 49B. A fluid passage formed by the first and second passages 5E and 5F, the oil supply chamber 310, the first and second communication passages 5G and 5H, and the first and second communication holes 61 and 63 is one example of the backpressure passage of the present invention. It is to be noted that in the case that the first communication passage 5G is in communication with the first and second communication holes 61 and 63 as described above, the second communication passage 5H may be omitted.

According to the compressor of the first embodiment, when power is supplied to the stator 15 of FIG. 1, the motor mechanism 3 is actuated to cause the rotary shaft 19 to rotate about the axis of rotation X1. Then, the compression mechanism 13 is actuated and the rotor 41 rotates within the cylinder block 7. With the rotation of the rotor 41, the volume of the respective compression chambers 30A and 30B increases and decreases repeatedly alternately. Refrigerant gas at a low pressure is taken in from the motor chamber 1C through the suction passages 33A and 33B and the suction port 33C for compression in the compression chambers 30A and 30B. The refrigerant gas that is compressed to a high pressure in the compression chambers 30A and 30B is discharged into the discharge chamber 9A through the discharge port 37A, the discharge space 37, the passage 5B, and the passage 35C. With the above operation air conditioning is performed in a vehicle.

According to the compressor of the first embodiment, the refrigerant gas that is compressed to a high pressure is discharged through the passages 5B and 35C to the oil separation chamber 35A where lubricant oil is separated from the refrigerant gas by centrifugal force. The lubricant oil contained in the compressed refrigerant gas is separated therefrom and stored in the discharge chamber 9A. Part of the lubricant oil in the discharge chamber 9A of a high pressure is supplied to the first and second backpressure chambers 49A and 49B through the first and second passages 5E and 5F, the oil supply chamber 310, the first communication passage 5G, and the second communication passage 5H. The lubricant oil is also supplied from the first communication passage 5G to the first and second backpressure chambers 49A and 49B through the first communication hole 61 and the second communication hole 63, respectively.

As the rotor 41 of FIG. 3 rotates with the rotation of the rotary shaft 19 from the position shown in FIG. 3 by 90 degrees in the arrow direction R1 to the position shown in FIG. 4, the second vane 52 slides into the second vane slot 41B while being pushed by the inner peripheral surface 31S of the rotor chamber 31, while the first vane 51 slides out of the first vane slot 41A while being pushed by the second vane 52.

Specifically, the second vane 52 sliding inwardly in the second vane slot 41B pushes the second transmission pins 120 and 140 toward the center of the rotor 41 against the urging force of the first and second coil springs 91 and 93, respectively. Accordingly, the second vane 52 sliding into the second vane slot 41B pushes the first vane 51 to slide outward of the first vane slot 41A. Such inward movement of the second vane 52 in the second vane slot 41B is thus transmitted to the first vane 51 through the first transmission pins 110 and 130, the second transmission pins 120 and 140, and the first and second coil springs 91 and 93. Accordingly, the first vane 51 is caused to slide out of the first vane slot 41A for a distance corresponding to the inward movement of the second vane 52 while sliding on the inner peripheral surface 31S of the rotor chamber 31.

As the rotor 41 rotates by another 90 degrees from the position of FIG. 4, the positions of the first vane 51 and the second vane 52 are reversed as compared to their positions shown in FIG. 3. Further rotation of the rotor 41 from the reversed position causes the first vane 51 to be pushed by the inner peripheral surface 31S of the rotor chamber 31 and slide inward in the first vane slot 41A. Similarly, the movement of the first vane 51 in the first vane slot 41A is transmitted to the second vane 52 through the first transmission pins 110 and 130, the second transmission pins 120 and 140, and the first and second coil springs 91 and 93. Therefore, according to the compressor of the first embodiment, the first and second vanes 51 and 52 repeatedly slide in and out of the first and second vane slots 41A and 41B, respectively, with the rotation of the rotor 41.

The first coil spring 91 is supported by the first shaft portion 115 of the first transmission pin 110 and the second shaft portion 125 of the second transmission pin 120. Similarly, the second coil spring 93 is supported by the first shaft portion 135 of the first transmission pin 130 and the second shaft portion 145 of the second transmission pin 140. The first and second coil springs 91 and 93 are held in position in the first and second communication holes 61 and 63 and the first and second vane slots 41A and 41B, respectively. Accordingly, the first and second coil springs 91 and 93 smoothly transmit the movement of the first vane 51 to the second vane 52 through the first transmission pins 110 and 130 and the second transmission pins 120 and 140 and also transmit the movement of the second vane 52 to the first vane 51.

Further, according to the compressor of the first embodiment, wherein the first transmission pin 110 and the second transmission pin 120 are disposed in the first communication hole 61 with the inner ends thereof facing each other and with the clearance S1 therebetween and the first transmission pin 130 and the second transmission pin 140 are disposed in the second communication hole 63 with the inner ends thereof facing each other and with the clearance S2 therebetween. Therefore, the compression and extension of the first and second coil springs 91 and 93 absorb the variation in the distance between the first vane 51 and the second vane 52 which may occur when the first vane 51 and the second vane 52 slide in and out of the first vane slot 41A and the second vane slot 41B, respectively. This prevents contact between the first and second transmission pins 110 and 120 and also between the first and second transmission pins 130 and 140. Accordingly, the first vane 51 and the second vane 52 may be pressed stably against the inner peripheral surface 31S of the rotor chamber 31. Additionally, the first transmission pins 110 and 130 and the second transmission pins 120 and 140 do not interfere with the rotation of the rotor 41.

According to the compressor of the first embodiment, when the first vane 51 slides out of the first vane slot 41A and the second vane 52 slides out of the second vane slot 41B, one end portion of each of the first and second coil springs 91 and 93 is in the first vane slot 41A and the other end portion of each of the first and second coil springs 91 and 93 is in the second vane slot 41B. On the other hand, when the first vane 51 is completely received in the first vane slot 41A, as shown in FIG. 3, one end portion of the first coil spring 91 is positioned within the first communication hole 61 and one end portion of the second coil spring 93 is positioned within the second communication hole 63, as shown in FIG. 2. Although not shown in the drawing, when the second vane 52 is completely received in the second vane slot 41B, the other end portion of the first coil spring 91 is positioned within the first communication hole 61 and the other end portion of the second coil spring 93 is positioned within the second communication hole 63.

According to the compressor of the first embodiment, by fitting the first transmission pins 110 and 130 to the first vane 51, the first flange portions 113 and 133 are in contact with the edge portions 51E and 51F, respectively.

Similarly, by fitting the second transmission pins 120 and 140 to the second vane 52, the second flange portions 123 and 143 are in contact with the edge portions 52E and 52F, respectively. The first coil spring 91 that is disposed between the first transmission pin 110 and the second transmission pin 120 is always in a compressed state and the second coil spring 93 that is disposed between the first transmission pin 130 and the second transmission pin 140 is always in a compressed state. According to the compressor of the first embodiment, therefore, the first transmission pins 110 and 130 and the second transmission pins 120 and 140 are kept in contact with the bottom surfaces 51S and 52S of the first and second vanes 51 and 52, respectively, so that the first transmission pins 110 and 130 and the second transmission pins 120 and 140 are prevented from being displaced in the radial direction of the roto 41. Accordingly, the loose-fit portions 111 and 131 of the first transmission pins 110 and 130 are kept from being brought into contact with the bottom surfaces of the of the recessed portions 51H and 51J, respectively, so that noise development due to the contacting will not occur. Similarly, the loose-fit portions 121 and 141 of the second transmission pins 120 and 140 are also kept from being brought into contact with the bottom surfaces of the recessed portions 52H and 52J, respectively, with the result that noise due to the contacting will not occur.

The first transmission pins 110 and 130 and the second transmission pins 120 and 140 are kept in contact with the bottom surfaces 51S and 52S of the first and second vanes 51 and 52, respectively. Therefore, the first end surface 113T of the first flange portion 113 that is urged by the first coil spring 91 is kept in surface contact with the edge portion 51E. The first end surface 133T of the first flange portion 133 that is urged by the second coil spring 93 is kept in surface contact with the edge portion 51J. During the operation of the compressor, the first flange portions 113 and 133 are kept from being brought into contact with the edge portions 51E and 51F, that is, the bottom surface 51S of the first vane 51, so that noise due to the contacting will not occur. The same holds true for the second flange portions 123 and 143.

Further, in the compressor, the first vane 51 and the second vane 52 are supported by the urging force of the first coil spring 91 acting on the first flange portion 113 of the first transmission pin 110 and the second flange portion 123 of the second transmission pin 120 in such directions that the first vane 51 and the second vane 52 are urged away from each other. The first vane 51 and the second vane 52 are also supported by the second coil spring 93 acting on the first flange portion 133 of the first transmission pin 130 and the second flange portion 143 of the second transmission pin 140 in such directions that the first vane 51 and the second vane 52 are urged away from each other.

The first end surface 113T of the first flange portion 113 is in surface contact with the edge portion 51E of the first vane 51, and the first end surface 133T of the first flange portion 133 is in surface contact with the edge portion 51F of the first vane 51. The first end surface 123T of the second flange portion 123 is in surface contact with the edge portion 52E of the second vane 52, and the first end surface 143T of the second flange portion 143 is in surface contact with the edge portion 52F of the second vane 52. In the compressor of the present embodiment, therefore, the first and second coil springs 91 and 93 urge and support the first vane 51 and the second vane 52 in a stable manner as compared with a configuration in which the first and second coil springs 91 and 93 are directly in contact with the first vane 51 and the second vane 52, thus permitting the first vane 51 and the second vane 52 to slide stably in and out of the first vane slot 41A and the second vane slot 41B, respectively. Accordingly, the first vane 51 and the second vane 52 are pressed securely against the inner peripheral surface of the rotor chamber 31, preventing the refrigerant gas from leaking out of the compression chambers 30A and 30B.

The compressor according to the first embodiment is very silent in operation and has an improved compression efficiency.

Further, according to the compressor of the first embodiment, the first transmission pins 110 and 130 are assembled to the first vane 51 by loosely fitting the first loose-fit portions 111 and 131 in the recessed portions 51H and 51J, respectively. Similarly, the second transmission pins 120 and 140 are assembled to the second vane 52 by loosely fitting the second loose-fit portions 121 and 141 in the recessed portions 52H and 52J, respectively. Such loose fitting facilitates the assembly of the first transmission pins 110 and 130 and the second transmission pins 120 and 140 to the first vane 51 and the second vane 52, respectively, as compared with a case in which the first transmission pins 110 and 130 are press-fitted into the recessed portions 51H and 51J and the second transmission pins 120 and 140 are press-fitted into the recessed portions 52H and 51J, respectively, which may cause deformation to the first and second vanes 51 and 52. Such structure of the compressor according to the first embodiment helps to facilitate the manufacturing of the compressor.

In the compressor of the first embodiment, wherein the first loose-fit portions 111 and 131 and the second loose-fit portion 121 and 141 are loosely inserted into the recessed portions 51H and 51J and the recessed portions 52H and 52J, respectively, the clearances formed by such loose fitting may absorb the tolerances of the loose-fit portions 111, 121, 131, and 141 and the recessed portions 51H, 51J, 52H, and 52J, permitting easier dimensional control as compared with a case in which the loose-fit portions such as 111, 121, 131, and 141 are press-fitted in the recessed portions. Accordingly, the compressor may improve the freedom of design of the first and second transmission pins 110 to 140 and the first and second vanes 51 and 52.

The first transmission pin 110 has the first tapered portion 115A and the second transmission pin 130 has the first tapered portion 135A. Similarly, the second transmission pin 120 has the second tapered portion 125A and the second transmission pin 140 has the second tapered portion 145A. The provision of the first tapered portions 115A and 135A prevent the first coil spring 91 from being caught between the first shaft portion 115 of the first transmission pin 110 and the second shaft portion 125 of the second transmission pin 120. The provision of the second tapered portions 125A and 145A also prevent the second coil spring 93 from being caught between the first shaft portion 135 of the first transmission pin 130 and the second shaft portion 145 of the second transmission pin 140. Therefore, the first and second coil springs 91 and 93 stably urge the first and second vanes 51 and 52.

According to the compressor of the first embodiment, the diameter of the first flange portions 113 and 133 is smaller than the diameter of the first and second communication holes 61 and 63, and the diameter of the second flange portions 123 and 143 is smaller than the diameter of the first and second communication holes 61 and 63. Therefore, contact between the first and second flange portions 113 and 123 and the inner wall of the first communication hole 61 is prevented and contact between the first and second flange portions 133 and 143 and the inner wall of the second communication hole 63 is also prevented. Accordingly, the first vane 51 slides smoothly in and out of the first vane slot 41A and the second vane 52 slides smoothly in and out of the second vane slot 41B.

According to the compressor of the first embodiment, wherein the first flange portion 113 is formed around the entire circumference of the first transmission pin 110 and the second flange portion 123 is formed around the entire circumference of the second transmission pin 120, it is easy to form the first and second flange portions 113 and 123 and hence the first and second transmission pins 110 and 120. The same holds true for the first and second transmission pins 130 and 140.

Further, according to the compressor of the first embodiment, wherein part of the refrigerant gas that is compressed to a high pressure and discharged into the discharge chamber 9A is supplied to the first and second backpressure chambers 49A and 49B through the first and second passages 5E and 5F, the oil supply chamber 310, the first and second communication passages 5G and 5H, and the first and second communication holes 61 and 63, the first and second vanes 51 and 52 are pressed against the inner peripheral surface 31S of the rotor chamber 31 by the backpressures in the first backpressure chamber 49A and the second backpressure 49B in addition to the first and second coil springs 91 and 93 that support and urge the first and second vanes 51 and 52 against the inner peripheral surface 31S. Therefore, the first and second vanes 51 and 52 are pressed so securely against the inner peripheral surface 31S of the rotor chamber 31 that the refrigerant gas is prevented from leaking out of the compression chambers 30A and 30B.

According to the compressor of the first embodiment, the first and second communication holes 61 and 63 are formed through the rotary shaft 19 and also in communication with the first communication passage 5G. Thereby, the first and second communication holes 61 and 63 may function as the backpressure passage and, therefore, the configuration of the backpressure passage may be simplified.

Further, according to the compressor of the first embodiment, the first vane 51 and the second vane 52 have substantially the same shape, and the first and second transmission pins 110 to 140 have also substantially the same shape. Therefore, the first vane 51 and the second vane 52 can be used interchangeably and the first and second transmission pins 110 to 140 can also be used interchangeably, which simplifies manufacturing of the vanes and the transmission pins and helps to reduce the manufacturing cost of the vane compressor.

Second Embodiment

Figure 6:
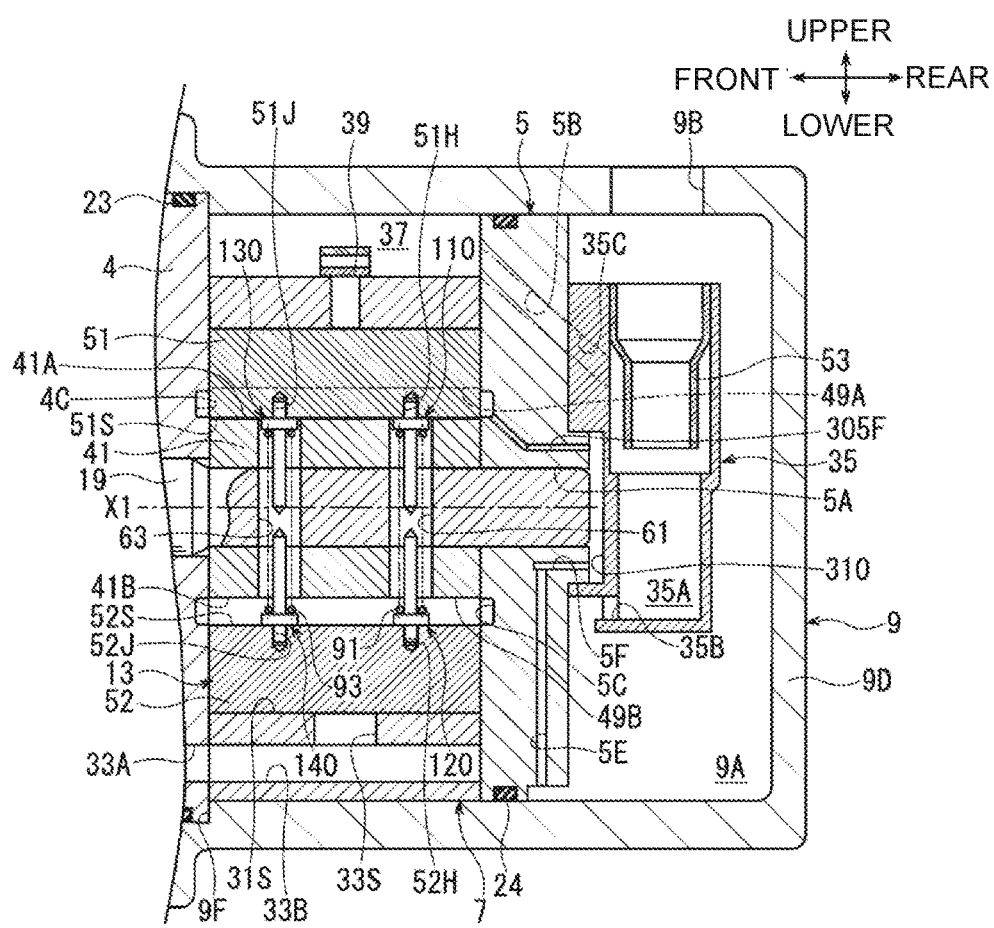
FIG. 6 is a fragmentary cross-sectional view of a vane compressor according to a second embodiment of the present invention.

Referring to FIG. 6 showing a compressor according to a second embodiment of the present invention, the second embodiment differs from the first embodiment in that the communication passage 5G of the compressor according to the first embodiment is dispensed with. The first side plate 4 has in the rear surface thereof an annular groove 4C that is formed in an annular shape about the axis of rotation X1. Similarly, the second side plate 5 has in the front surface thereof an annular groove 5C that is formed in an annular shape about the axis of rotation X1. The annular groove 4C and the annular groove 5C are formed symmetrically with respect to an imaginary plane passing perpendicularly to the axis of rotation X1 through the center of the cylinder block 7. The second side plate 5 further has therethrough a second passage 305F that provides fluid communication between the upper end of the first passage 5E and the annular groove 5C. The second passage 305F formed extending across the thickness of the second side plate 5 includes two portions, namely a first portion that extends frontward from the rear surface of the second side plate 5 midway of the thickness of the second side plate 5 and a second portion that is connected to the first portion and extends obliquely upward to the front surface of the second side plate 5. The rest of the structure of the compressor according to the second embodiment is substantially the same as that of the first embodiment and, therefore, detailed description thereof will not be reiterated.

According to the compressor of the second embodiment, part of the lubricant oil stored in the discharge chamber 9A is supplied to the first backpressure chamber 49A and the second backpressure chamber 49B through the first and second passages 5E and 305F and the annular groove 5C. The annular groove 4C provides fluid communication between the first backpressure chamber 49A and the second backpressure chamber 49B to thereby adjust the difference in pressure between the first backpressure chamber 49A and the second backpressure chamber 49B. The compressor of the second embodiment having the above configuration also provides the same effect as the compressor according to the first embodiment.

Although the first and second embodiments of the present invention have been described, the present invention is not limited to the above two embodiments, and it may variously be modified within the spirit of the present invention.

According to the first and second embodiments of the present invention, the first transmission pins 1110 and 130, the second transmission pins 120 and 140, and the first and second coil springs 91 and 93 are provided between the first vane 51 and the second vane 52. According to the present invention, however, it may be so configured that only the first transmission pin 110, the second transmission pin 120, and the first coil spring 91 are provided between the first vane 51 and the second vane 52. Furthermore, only the first transmission pin 110 and the first coil spring 91 may be provided between the first vane 51 and the second vane 52. Alternatively, three or more first transmission pins, three or more second transmission pins, and three or more coil springs may be provided between the first vane 51 and the second vane 52.

According to the first and second embodiments of the present invention, the first flange portion 113 is in surface contact with the edge portion 51E of the recessed portion 51H and the second flange portion 123 is in surface contact with the edge portion 52E of the recessed portion 52H. According to the present invention, however, it may so configured that the first flange portion 113 is in surface contact with an area of the bottom surface 51S of the first vane 51 other than the edge portion 51E, and the second flange portion 123 is in surface contact with an area of the bottom surface 52S of the second vane 52 excluding the edge portion 52E. The same applies to the first and second flange portions 133 and 143.

In the first and second embodiments, the single first coil spring 91 may be substituted by two separate coil springs. The same applies to the second coil spring 93.

The compressor according to the present invention is applicable to an air conditioner for a vehicle or the like.

What is claimed is:

1. A vane compressor comprising:
    a housing having therein a rotor chamber;
    a rotor that is disposed in the rotor chamber so as to be rotatable about an axis of rotation and has therein a pair of vane slots;
    and a plurality of vanes provided in the respective vane slots so as to be slidable in and out of the vane slots, a compression chamber being formed by one surface of the rotor chamber, the other surface of the rotor chamber, an inner peripheral surface of the rotor chamber, an outer peripheral surface of the rotor, and any two adjacent vanes, wherein
    the vane slots include a first vane slot and a second vane slot that extends in a direction in which the first vane slot extends,
    the vanes include a first vane slidably received in the first vane slot and a second vane slidably received in the second vane slot,
    the rotor has therein a communication hole that provides communication between the first vane slot and the second vane slot,
    the first vane and the second vane have respective bottom surfaces near the axis of rotation of the rotor,
    at least one of the first vane and the second vane has a recessed portion in the corresponding bottom surface,
    the vane compressor further includes a transmission pin that is positioned in accommodated in the communication hole,
    the transmission pin includes a loose-fit portion that is loosely inserted in the recessed portion, a shaft portion that extends in a direction opposite to a direction in which the loose-fit portion is inserted and that extends towards a communication passage extending axially through a rotary shaft, and a flange portion that is formed between the loose-fit portion and the shaft portion and in contact with the bottom surface in which the recessed portion is formed,
    the vane compressor further includes a coil spring that is disposed in the communication hole to urge the first vane and the second vane in opposite directions away from each other via the flange portion, and
    the coil spring is disposed around the shaft portion and supported by the flange portion so as to urge and support the transmission pin.

2. The vane compressor according to claim 1, wherein the coil spring is disposed in a compressed state.

3. The vane compressor according to claim 1, wherein
    the first vane is configured to slide into the first vane slot and push the second vane to slide out of the second vane slot, and
    the second vane is configured to slide into the second vane slot and push the first vane to slide out of the first vane slot.

4. The vane compressor according to claim 1, wherein
    the recessed portion includes a first recessed portion formed in the bottom surface of the first vane and a second recessed portion formed in the bottom surface of the second vane,
    the transmission pin includes a first transmission pin that is disposed in the first recessed portion and extends toward the second vane and a second transmission pin that is disposed in the second recessed portion and extends toward the first vane,
    the first transmission pin and the second transmission pin are disposed such that inner ends of the first transmission pin and the second transmission pin face each other with a clearance therebetween,
    the first transmission pin includes a first loose-fit portion that is loosely inserted in the first recessed portion, a first shaft portion that extends in a direction opposite to a direction in which the first loose-fit portion is inserted, and a first flange portion that is formed between the first loose-fit portion and the first shaft portion and in contact with the bottom surface in which the first recessed portion is formed,
    the second transmission pin includes a second loose-fit portion that is loosely inserted in the second recessed portion, a second shaft portion that extends in a direction opposite to a direction in which the second loose-fit portion is inserted, and a second flange portion that is formed between the second loose-fit portion and the second shaft portion and in contact with the bottom surface in which the second recessed portion is formed,
    the communication hole provides communication between the first recessed potion and the second recessed portion, and
    one end of the coil spring is in contact with the first flange portion and the other end of the coil spring is in contact with the second flange portion.

5. The vane compressor according to claim 4, wherein
    the first shaft portion has a first tapered portion that is tapered toward the second transmission pin, and
    the second shaft portion has a second tapered portion that is tapered toward the first transmission pin.

6. The vane compressor according to claim 4, wherein diameters of the first flange portion and the second flange portion are smaller than a diameter of the communication hole.

7. The vane compressor according to claim 4, wherein the first vane and the second vane have a same shape, and the first transmission pin and the second transmission pin have a same shape.

8. The vane compressor according to claim 1, wherein
a discharge chamber is formed in the housing,
a first backpressure chamber is formed between the bottom surface of the first vane and a bottom surface of the first vane slot,
a second backpressure chamber is formed between the bottom surface of the second vane and a bottom surface of the second vane slot,
the rotary shaft is fixed in the rotor so as to extend along the axis of rotation and be rotatably supported by the housing, and
a backpressure passage that provides communication between the discharge chamber and the first and second backpressure chambers is formed in the rotary shaft and the rotor.

9. The vane compressor according to claim 8, wherein the communication hole extends through the rotary shaft and forms a part of the backpressure passage.

* * * * *